(12) United States Patent
Hotta (10) Patent No.: US 6,966,216 B2
(45) Date of Patent: Nov. 22, 2005

(54) LEAKAGE DETECTING DEVICE FOR SEALED PACKAGES

(76) Inventor: Shigeru Hotta, 3-11-8, Komoa Shiotu, Uenohara-machi, Kitaturu-gun, Yomanashi 409-0121 (JP)

( * ) Notice: Subject to any disclaimer, the term of this patent is extended or adjusted under 35 U.S.C. 154(b) by 0 days.

(21) Appl. No.: 10/398,047

(22) PCT Filed: Sep. 20, 2001

(86) PCT No.: PCT/JP01/08204

§ 371 (c)(1),
(2), (4) Date: Jul. 7, 2003

(87) PCT Pub. No.: WO02/29377

PCT Pub. Date: Apr. 11, 2002

(65) Prior Publication Data

US 2004/0020268 A1  Feb. 5, 2004

(30) Foreign Application Priority Data

Oct. 2, 2000 (JP) .............................. 2000-302570
Jun. 26, 2001 (JP) .............................. 2001-192368

(51) Int. Cl.$^7$ .......................................... G01M 3/34
(52) U.S. Cl. ........................... 73/49.3; 73/40; 73/49.2
(58) Field of Search ................ 73/49.3, 40, 49.2; 53/451

(56) References Cited

U.S. PATENT DOCUMENTS

| | | | | |
|---|---|---|---|---|
| 3,091,114 A | * | 5/1963 | Webster | 73/49.3 |
| 3,577,769 A | * | 5/1971 | Roberts | 73/40.7 |
| 3,591,944 A | * | 7/1971 | Wilcox | 53/408 |
| 3,592,049 A | * | 7/1971 | Johanski, Jr. | 73/45.2 |
| 3,708,949 A | * | 1/1973 | Wilcox | 53/53 |
| 4,813,268 A | * | 3/1989 | Helvey | 73/40.7 |
| 5,010,761 A | * | 4/1991 | Cohen et al. | 73/40.7 |
| 5,029,463 A | * | 7/1991 | Schvester et al. | 73/40.7 |
| 5,345,809 A | * | 9/1994 | Corrigan et al. | 73/23.2 |
| 5,369,983 A | * | 12/1994 | Grenfell | 73/40.7 |
| 5,373,729 A | * | 12/1994 | Seigeot | 73/49.3 |
| 5,388,446 A | * | 2/1995 | Kronberg | 73/40.7 |
| 5,465,607 A | * | 11/1995 | Corrigan et al. | 73/23.36 |
| 5,499,529 A | * | 3/1996 | Kronberg et al. | 73/40.7 |
| 5,939,619 A | * | 8/1999 | Achter et al. | 73/40.7 |
| 6,050,133 A | * | 4/2000 | Achter et al. | 73/40.7 |
| 6,279,384 B1 | * | 8/2001 | Heikkinen et al. | 73/40.7 |
| 6,711,874 B1 | * | 3/2004 | Nakagawa et al. | 53/64 |

FOREIGN PATENT DOCUMENTS

| | | | | |
|---|---|---|---|---|
| EP | 0 445 002 A2 | | 9/1991 | |
| JP | 01226572 A | * | 9/1989 | B65D 81/10 |
| JP | H04-216430 | | 8/1992 | |
| JP | H07-225171 | | 8/1995 | |
| JP | H09-120347 | | 8/1995 | |

(Continued)

Primary Examiner—Hezron Williams
Assistant Examiner—Rodney Frank
(74) Attorney, Agent, or Firm—Pendorf & Cutliff (57) ABSTRACT

The object of this invention is to provide a leakage-detecting device for sealed packages that is capable of performing detection continuously for all sealed packages when performing leakage detection for sealed packages.

This invention comprises a conveyor belt 3 that continuously moves sealed packages W that are filled with detection gas for leakage detection and a leakage-detection unit 4 that detects leakage from said sealed package; and where the leakage-detection unit comprises a vibration-application means 5 that applies vibration to the detection gas inside the sealed package, and a gas-detection means 6 that detects leakage of the detection gas from the sealed package.

14 Claims, 9 Drawing Sheets

FOREIGN PATENT DOCUMENTS

| | | |
|---|---|---|
| JP | H08-156921 | 6/1996 |
| JP | H10-305821 | 11/1998 |

* cited by examiner

LEAKAGE DETECTING DEVICE FOR SEALED PACKAGES

CROSS REFERENCE TO RELATED APPLICATION

This application is a national stage of PCT/JP01/08204 filed Sept. 20, 2001, and based upon Japanese application nos. 2000-302570 filed Oct. 2, 2000, and 2001-192368 filed Jun. 26, 2001, under the International Convention.

BACKGROUND OF THE INVENTION

1. Field of the Invention

This invention relates to a leakage-detecting device for sealed packages.

Also, this invention relates to a sealed container (including a sealed bag), which in the sealed state is used to store various items such as food, chemicals, batteries, and the like, and a method of detecting pinholes in that sealed container.

2. Description of the Related Art

Conventionally, sealed packages have been used as packages for food and the like in order to preserve freshness.

However, with these kinds of sealed packages, when there are pinholes, cracks, tears or the like, the sealing function is lost, however, inmost cases, the pinholes or cracks are very small and cannot be detected by visual inspection.

Therefore, attempts have been made to detect these kinds of pinholes or cracks by filling the sealed container with a detection gas for detecting leakage.

However, with the aforementioned prior technique, one or tens of sealed packages are taken to be an inspection unit, and leakage detection is performed for each detection unit (so called batch processing), so when leakage is found in one of the detection units, there was a problem in that all of the sealed packages of that detection unit had to be handled as being defective.

Taking this kind of prior problem into consideration, object (1) of this invention is to provide a leakage-detecting device for sealed packages that is capable of performing detection for all packages when performing leakage detection of the sealed packages.

As mentioned above, when there is a pinhole (small hole) in this kind of sealed container, it becomes easy for the stored contents such as food, chemicals or the like to react with air and to become spoiled or deteriorate, so in order to prevent this, it is necessary to inspect whether or not there are any pinholes in the container when shipping the product.

Conventionally, in order for this pinhole inspection, a method was performed in which helium gas was filled in the container along with the contents, and after the container was sealed (sealing process), inspection was performed using a gas detector for detecting whether or not there was helium gas leakage from the container.

In order to most efficiently perform the prior method mentioned above, it is preferred that the processes of filling the contents and helium into the container, sealing the container and detecting helium gas leakage after the container is sealed, be performed in a continuous product packaging line. However, in the case of the prior method, when filling the helium gas into the container together with the contents, a small amount of helium gas may leak outside of the container. In that case, the concentration of gas inside each of the containers to be inspected is not constant, and accurate inspection cannot be performed. Also, since helium gas is highly diffusible and mixes easily in the surrounding air, the gas detector reacts with the helium gas that leaked out during filling, and in that case, it is difficult to distinguish gas leakage after filling. Particularly, a high-performance gas detector reacts with even minute amounts of gas, so it reacts during filling even when there is only very little gas leakage. Therefore, a high-performance gas detector cannot be used.

From the above situation, in order to accurately inspect gas leakage after filling, the process of filling the helium gas and sealing the container must be performed in a different location than the process after that of inspecting for gas leakage. Also, supposing that there is a pinhole in a sealed container and that there is gas leakage, a large amount of gas leaks out while moving to the inspection process, and accurate inspection may not be possible. Furthermore, in the case of a large pinhole, all of the gas will leak out before inspection, and inspection becomes impossible. Moreover, this is also not preferred from an aspect of cost since expensive inspection gas is wasted.

This invention was devised to solve the weaknesses in the prior technology described above, object (2) of this invention is to provide a sealed container for which it is possible to accurately perform pinhole inspection (gas leakage inspection) using a small amount of inspection gas, and for which the process of filling the contents and inspection gas can be performed continuously in the same place as the pinhole inspection process, and to provide a pinhole-detection method that uses that sealed container.

SUMMARY OF THE INVENTION

In order to accomplish the aforementioned object (1), the leakage detection device for sealed packages of this invention comprises a conveyor belt that continuously moves sealed packages filled with detection gas for leakage detection, and a leakage detection unit that detects leakage of the sealed packages, and where the leakage detection unit comprises a vibration-application means that applies vibration to the detection gas inside the sealed packages, and a gas-detection means that detects gas leakage from the sealed packages.

Also, the vibration-application means can be a striking apparatus that strikes the sealed packages on the conveyor belt.

Also, the vibration-application means can be a vibrator that vibrates the sealed packages on the conveyor belt.

Moreover, the gas-detection means can comprise a box that forms a detection space that surrounds the vibration-application means and the conveyed sealed packages; a probe that is located inside this box and that draws in the gas from inside the detection space; and a gas detector that is connected to the probe.

Also, the detection gas is helium gas.

Furthermore, in order to accomplish the aforementioned object (2), this invention comprises a sealed container that contains a gas-filled body that can be broken from the outside of the sealed container.

It is preferred that this gas-filled body be a layered material in which a chloroethylene or polypropylene film is layered on a thin aluminum film.

Moreover, it is preferred that the gas filled in the gas-filled body be helium gas.

Furthermore, this invention provides a detection method of detecting pinholes in a sealed container by breaking the gas-filled body inside the sealed container to disperse the gas inside the sealed container, and inspecting whether or not there is gas leakage from the sealed container.

Breaking the gas-filled body can be performed by a pressure means from outside the sealed container. Also, it can be performed by a pair of suction means that pulls on both sides of the gas-filled body from the outside of the sealed container. Furthermore, breaking the gas-filled body can also be performed by electromagnetic radiation from the outside of the sealed container.

DETAILED DESCRIPTION OF THE INVENTION

The invention will be explained in more detail with reference to the attached drawings.

Figure 1:
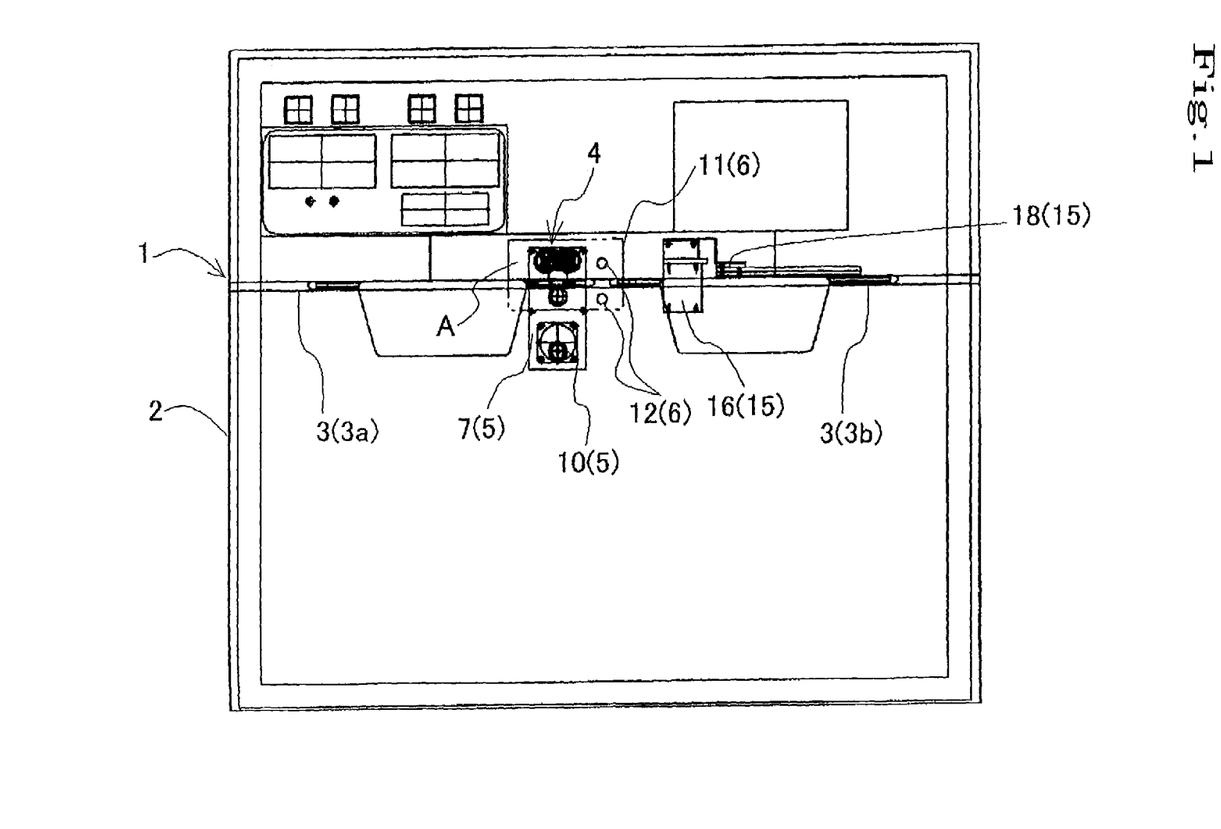
FIG. 1 is a front view showing the gas-leakage detecting device of an embodiment of the invention.
Figure 2:
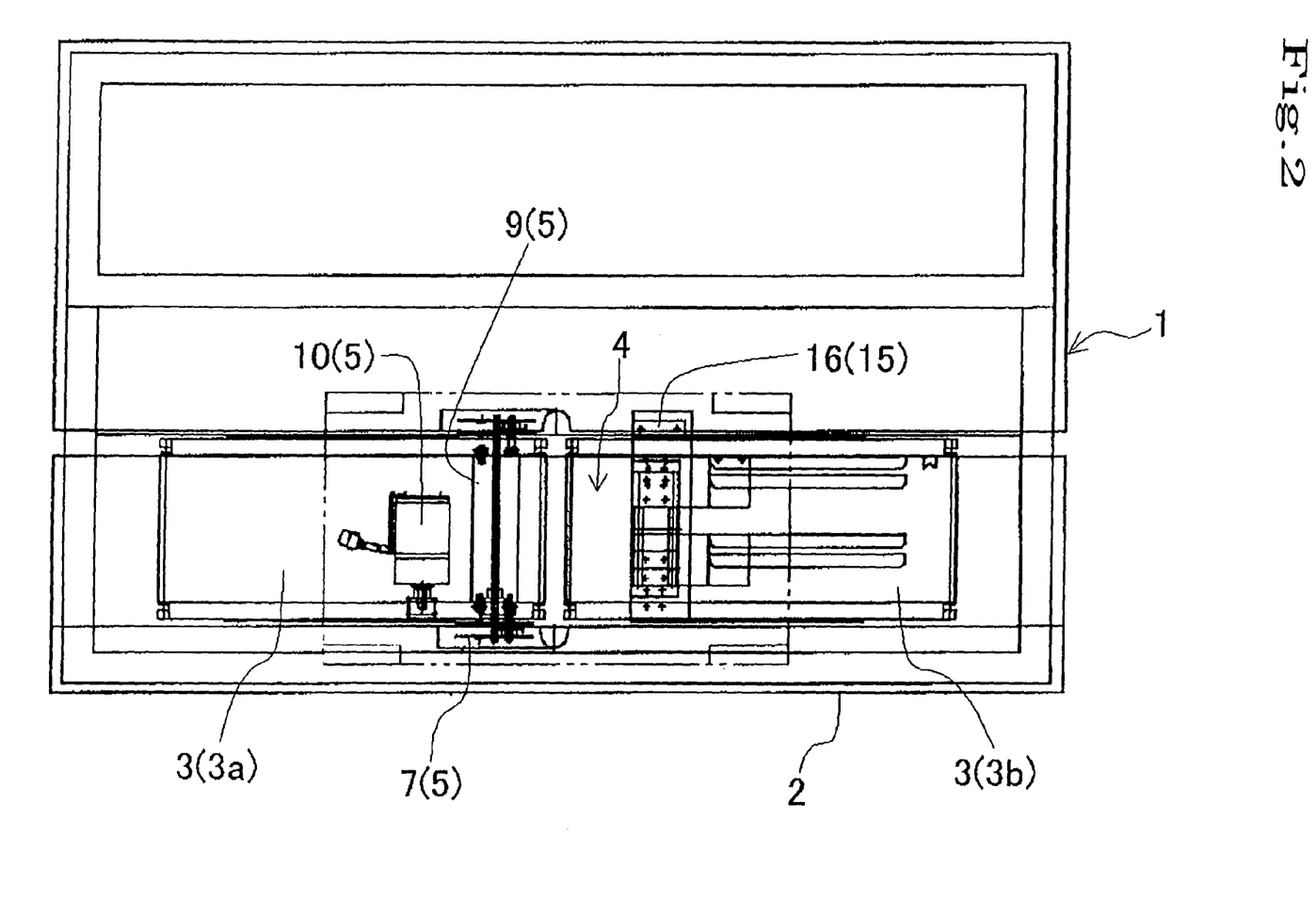
FIG. 2 is a top view showing the gas-leakage detecting device of an embodiment of the invention.
Figure 3:
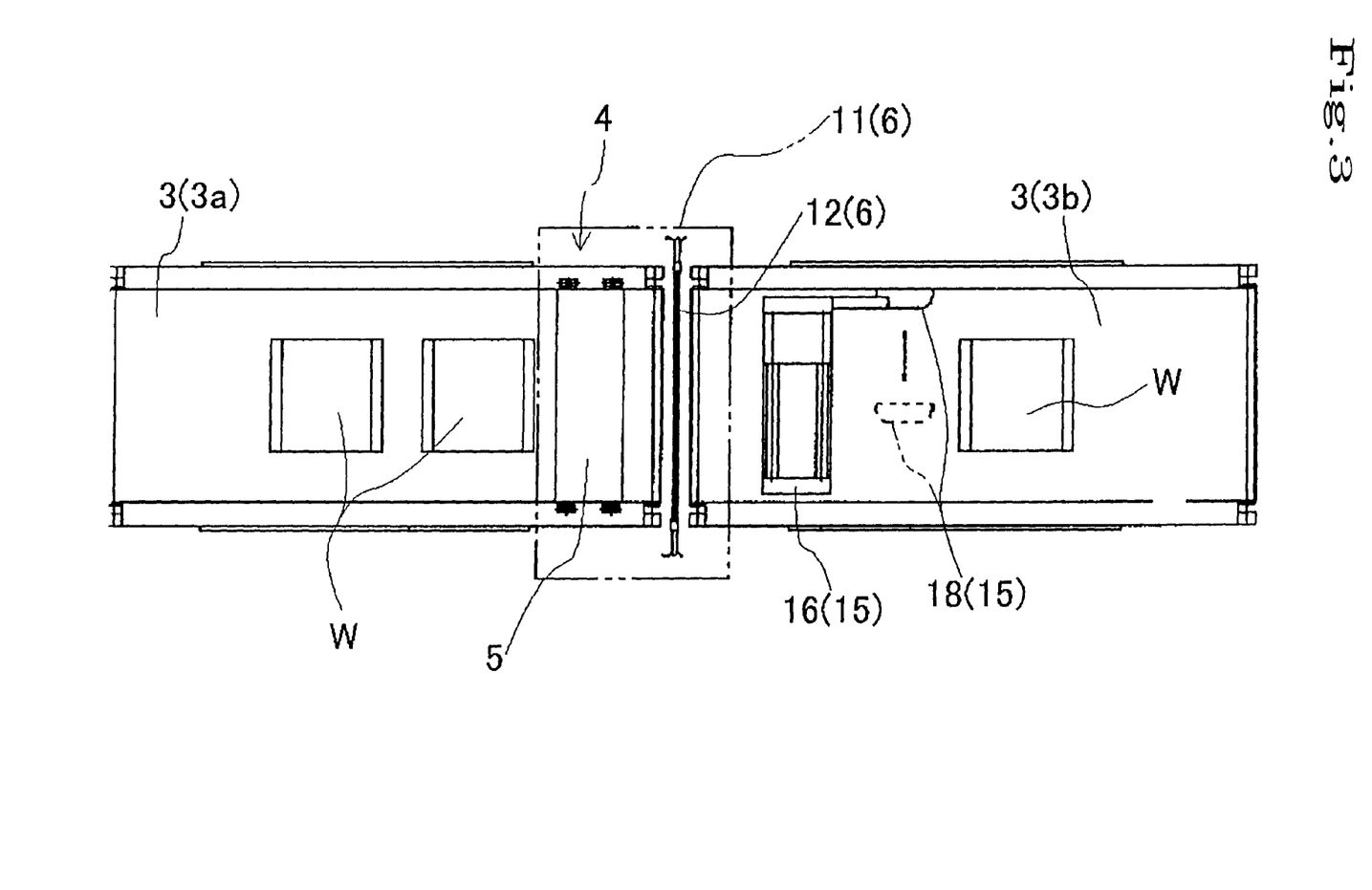
FIG. 3 is a top view of the main section of the gas-leakage detecting device of an embodiment of the invention.

As shown in FIG. 1, reference number 1 represents the leakage-detecting device for sealed packages of this embodiment that comprises a base 2, and a conveyor belt 3 that continuously moves sealed packages W that are filled with detection gas for leakage detection to the base 2; and where the conveyor belt 3 (in this embodiment, it comprises an input conveyor 3a and output conveyer 3b) is equipped with a leakage-detection unit 4 that is located part way along the conveyor path and that detects leakage from the sealed packages W; and where the leakage-detection unit 4 comprises a vibration-application means 5 that applies vibration to the detection gas inside the sealed packages W, and a gas-detection means 6 that detects the detection gas that leaks from the sealed packages W.

Figure 4:
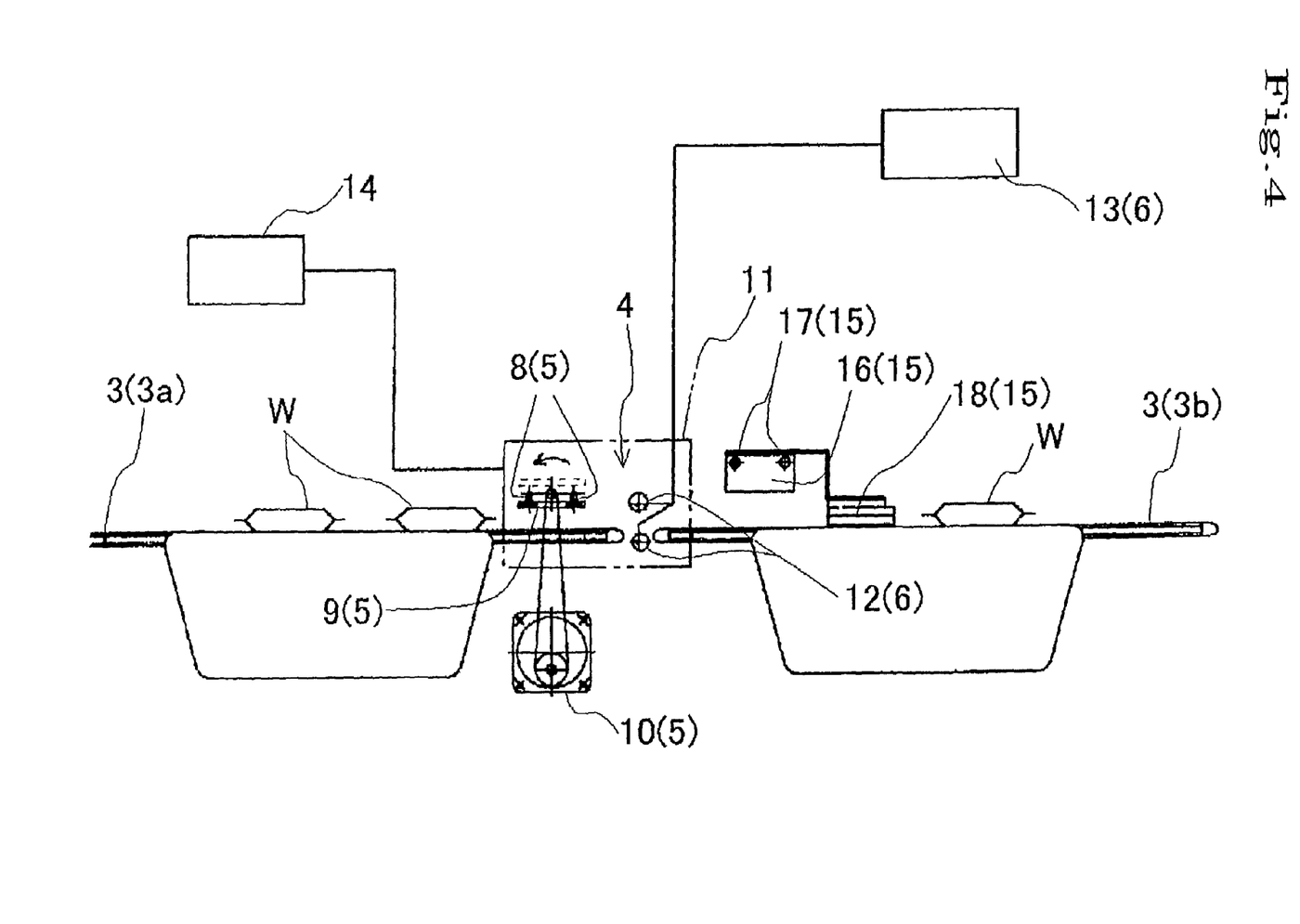
FIG. 4 is a front view of the main section of the gas-leakage detecting device of an embodiment of the invention.

To describe this in detail, the vibration-application means 5 comprises an striking device, as shown in FIG. 4, that strikes a sealed packages W from above after the sealed packages W has been moved to a specified location by the conveyor belt 3.

In other words, a free-rocking pressure plate 9 is attached by way of a link 8 to a bracket 7 that is installed above the conveyor belt 3, and a motor 10, which rotates the link 8 and causes the pressure plate 9 to move up and down, is connected to the link 8, and the up and down movement of the pressure plate 9 causes it to strike the sealed package W.

On the other hand, the gas-detection means 6 comprises a box 11 that forms a detection space A surrounding the vibration-application means 5 and the conveyed sealed package W, a probe 12 that is located inside this box 11 and that draws in gas from inside the detection space A, and a gas detector 13 that is connected to this probe 12.

The probe 12 is spaced above and below the conveyor path of the sealed package W, and in this embodiment the probe 12 is formed by forming a plurality of inlet holes that are spaced apart at specified intervals in the length direction of a pipe.

Moreover, this probe 12 runs along the outer shape of the sealed package W, and preferably, it is arranged such that it completely surrounds the sealed package W.

Furthermore, there is a blower 14 connected to the box 11 that sucks in the gas from inside the box 11 and discharges it to the outside, and as will be described later, when leakage is detected in the sealed package W, the blower 14 cleans the inside of the box 11 before a new sealed package W is brought inside the box 11.

On the other hand, down line from the box 11, the leakage-detection unit 4 sends the sealed package W that was detected to be leaking on a conveying route that is different than the proper conveying route, or there is a work-removal apparatus that removes the work away from the conveyor belt 3.

This work-removal apparatus 15 comprises a bracket 16 that is fastened to the base 2, an electric or pneumatic type plunger 17 that is attached to the bracket 16, a removal plate 18 that is located such that it faces the conveyor belt 3 through a space, and that is moved back and forth by the plunger 17 in a direction orthogonal to the conveying direction of the conveyor belt 3 and moves the sealed package W.

The function of the leakage-detecting device 1 of this embodiment, constructed as described above, is explained below.

The sealed packages W, which are filled with helium gas as the detection gas, are continuously supplied at specified intervals to the conveyor belt 3 of this leakage-detecting device 1 by a separate detection-gas-filling apparatus.

The sealed packages W that are supplied in this way are conveyed to the leakage-detection unit 4 by the conveyor belt 3.

A sealed package W that is conveyed to this leakage-detection unit 4 is sent to the vibration-application means 5 inside the box 11, and here by moving the pressure plate 9 of the vibration-application means 5 up and down, the sealed package W is pressed by this pressure plate 9.

Here, the gas inside the box 11, which is constantly drawn in by the probe 12, is sent to the gas detector 13.

When there is a pinhole or crack in the sealed package W, since the sealed package W has been filled with detection gas by the detection-gas-filling apparatus, the detection gas inside is released inside the box 11 when that sealed package W is pressed by the pressure plate 9 in the vibration-application means 5, and it is drawn in by the probe 12 and detected by the gas detector 13.

Defective items are detected in this way.

When a defective item is detected in this way, the inside of the box 11 is contaminated by the detection gas, so after the defective item has been output, the blower 14 operates and cleans out the inside of the box 11, then inspection of the next sealed package W is performed.

Here, when it is determined that a sealed package W is good, the inside of the box 11 is not contaminated, so the blower 14 remains stopped.

Furthermore, when a sealed package W that has been determined to be defective is output from the box 11, as soon as this sealed package W has been conveyed to a specified location, the plunger 17 of the work-removal apparatus 15 operates and the removal plate 18 that is attached to the plunger 17 pushes the sealed package W in the width direction of the conveyor belt 3 and changes its route, or removes it from the conveyor belt 3.

The leakage-detecting device 1 of this embodiment presses sealed packages W that are conveyed continuously at specified intervals, and when there is a pinhole or crack, it forcibly presses detection gas from the pinhole or crack, and can determine whether the package is defective or not.

Therefore, it is possible to perform continuous inspection of the sealed packages W and to inspect all of the packages.

The shapes and dimensions of the components shown in the embodiment are just one example, and various alterations are possible according to design needs.

For example, it is possible to install a vibrator on the conveyor belt 3 as the vibration-application means 5, and apply vibration to the sealed packages W on the conveyor belt 3 by applying vibration to the conveyor belt 3 by the vibrator.

Also, this vibrator can be an electrical-type, magnetic-type or mechanical-type vibrator.

Figure 5:
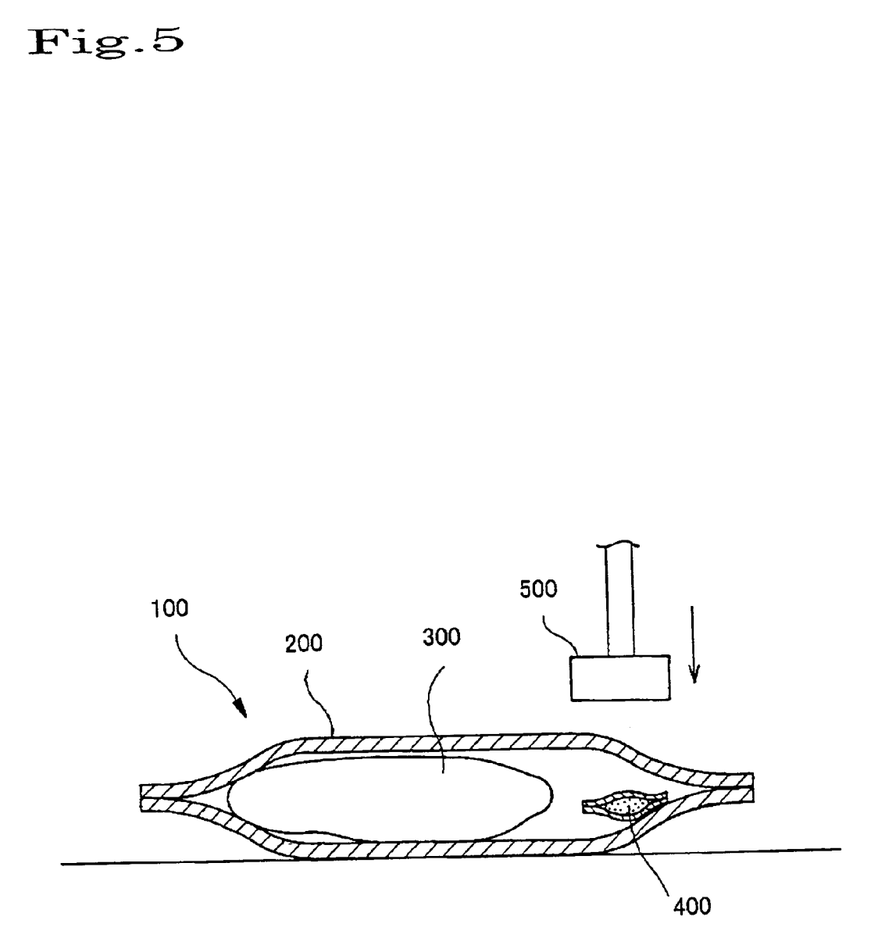
FIG. 5 is a top view showing the sealed container and pinhole-detection process of the invention.
Figure 6:
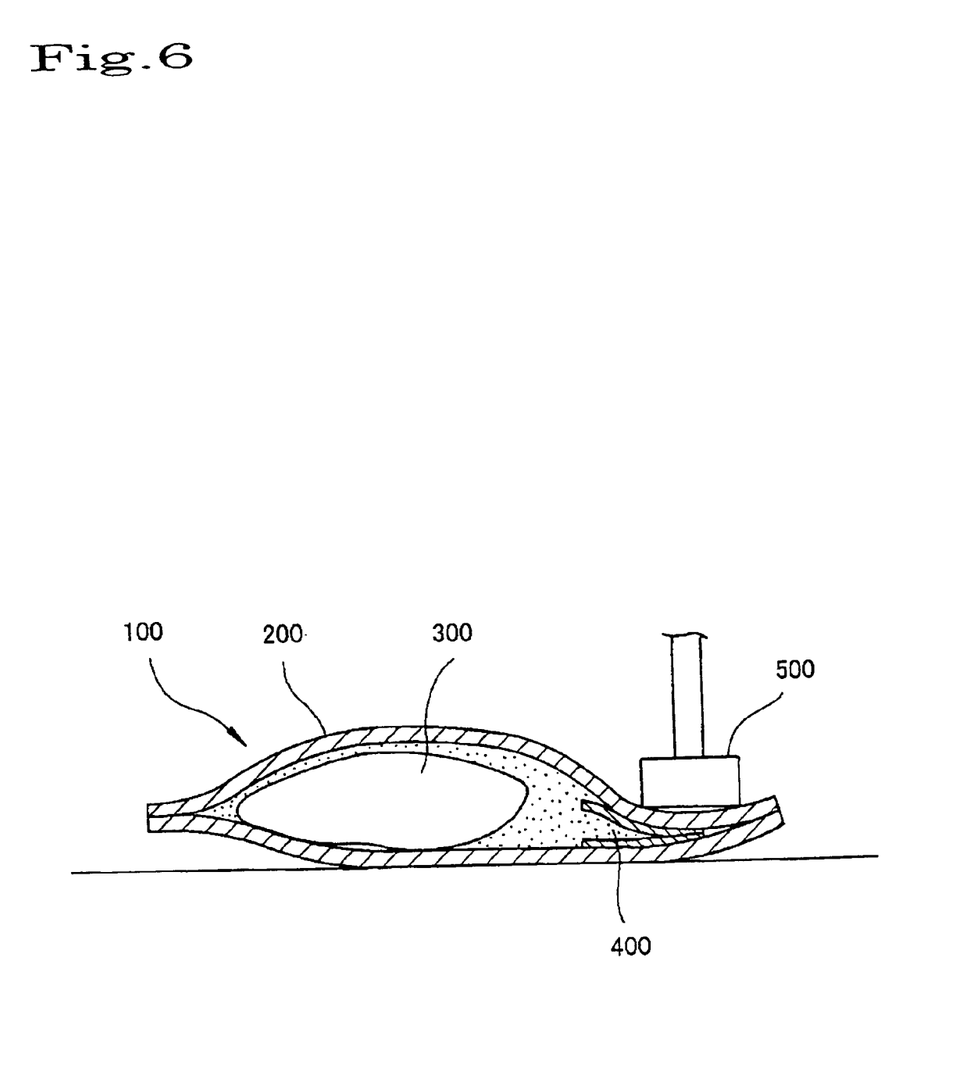
FIG. 6 is a top view showing the sealed container and pinhole-detection process of the invention.

In FIG. 5 and FIG. 6, the sealed container 100 of this invention comprises a container 200 made of plastic, and the contents 300, such as food, and a gas-filled body 400 that are stored in this container.

The gas-filled body 400 is made of a layered material in which a chloroethylene or polypropylene film is layered on a thin aluminum film and formed into a small bag shape, and Helium gas is filled inside this gas-filled body. The material of the of the gas-filled body 400 is not limited to that described above, however, in the case of just a plastic film, the gas can permeate the film, so it is preferred that an aluminum layer that has poor gas permeability be used. Also, it is possible to use another gas instead of helium gas as the filled gas, however, helium gas is chemically stable and does not react easily with food or chemicals, so taking these points into consideration, helium gas is the most preferable.

The gas-filled body 400 is made separately from the container 200, and is stored in the container 200 together with the contents 300. When doing this, the gas-filled body can be attached beforehand to a specified place inside the container for convenience of the pinhole inspection described below.

A sealed container 100 that stores the contents and gas-filled body is inspected when shipped as a product to determine whether or not it has a pinhole. This pinhole inspection is performed using the following process.

First, a pressure means 500 that is located on the line presses the gas-filled body 400 from the outside of the sealed container 100 and breaks the gas-filled body 400 by that pressure (see FIG. 6). Together with breaking the gas-filled body 400, it disperses the helium gas filled inside it inside the sealed container 100. Next, this is then inspected by a gas detector (not shown in the figure) that is also located on the line for whether or not there is any leakage of helium gas. Supposing that helium gas is leaking from the sealed container 100, the gas detector reacts with it, and in this way, a pinhole in the sealed container is detected.

Figure 7:
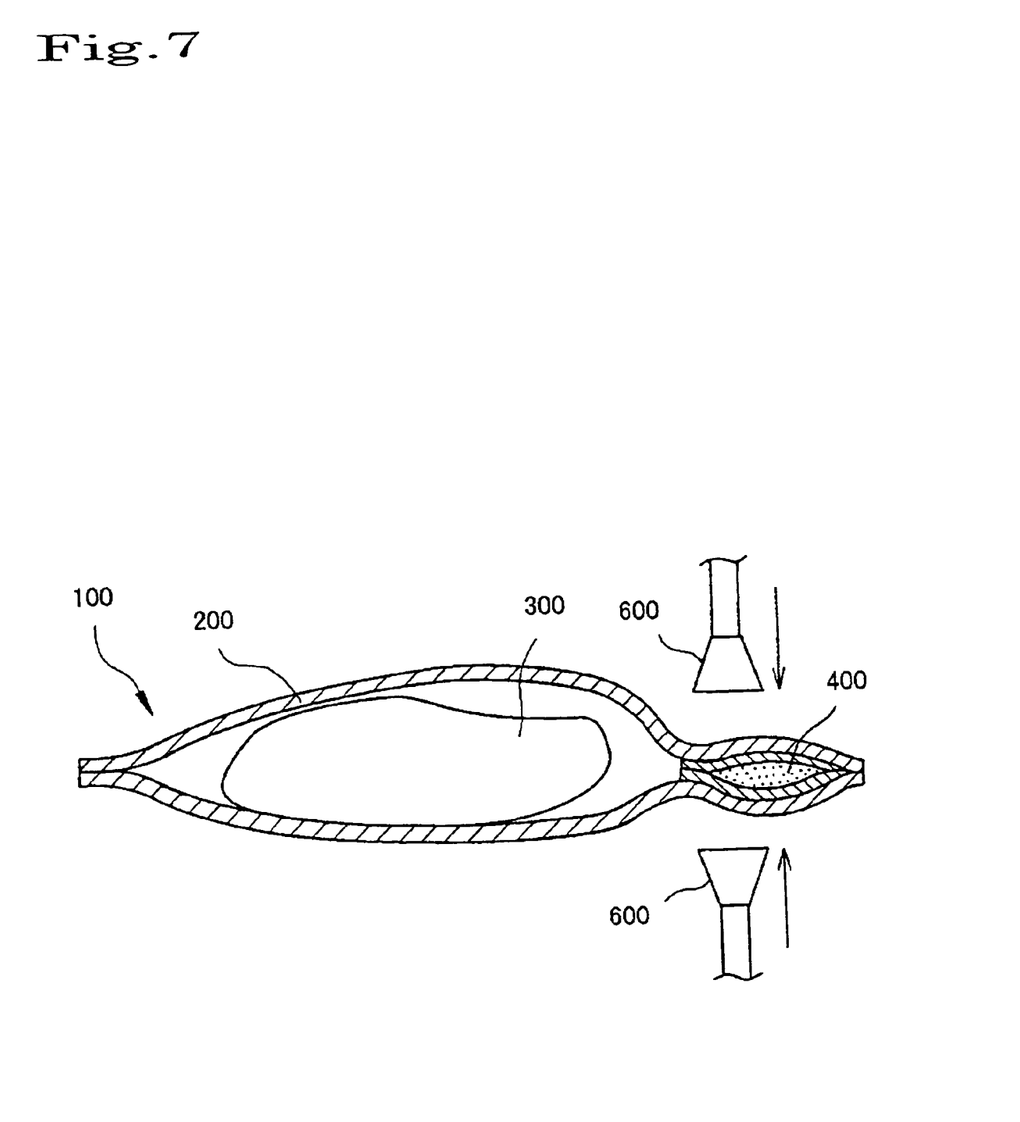
FIG. 7 is a top view showing the sealed container and pinhole-detection process of the invention.
Figure 8:
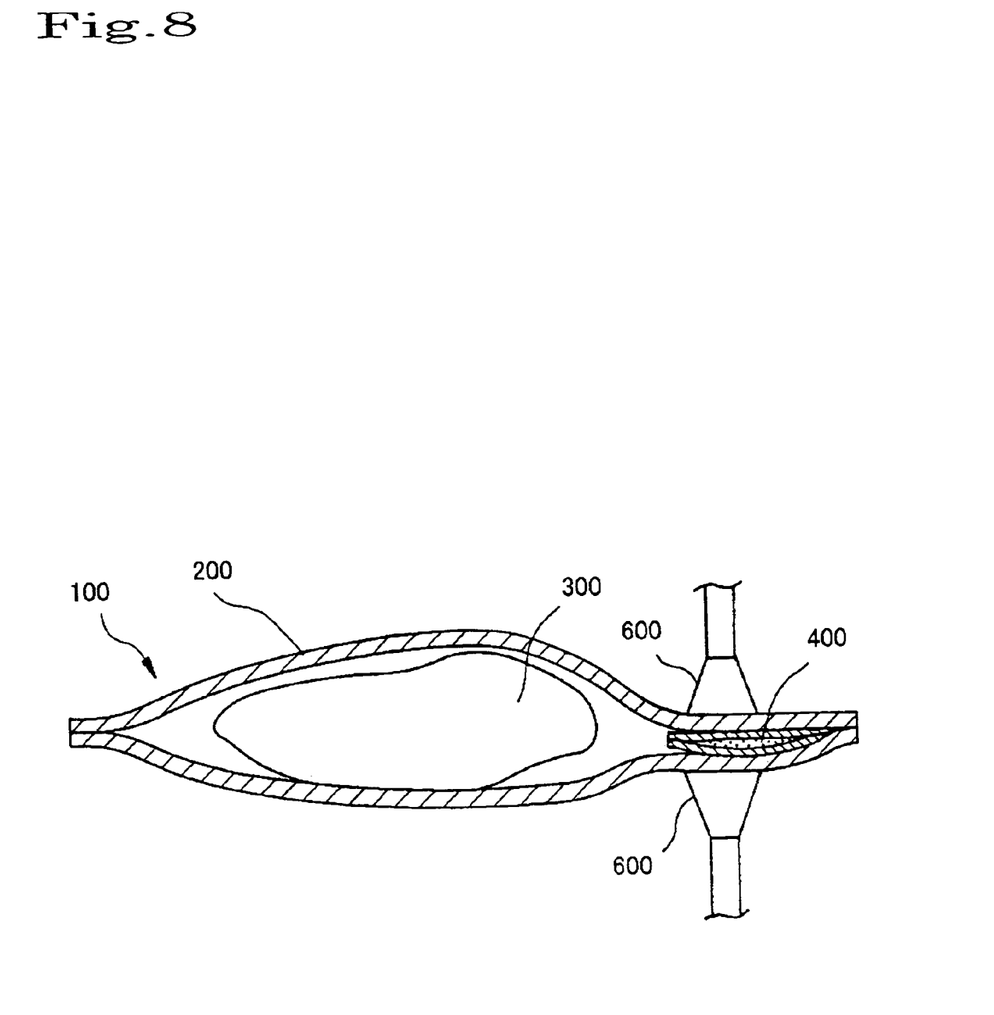
FIG. 8 is a top view showing the sealed container and pinhole-detection process of the invention.
Figure 9:
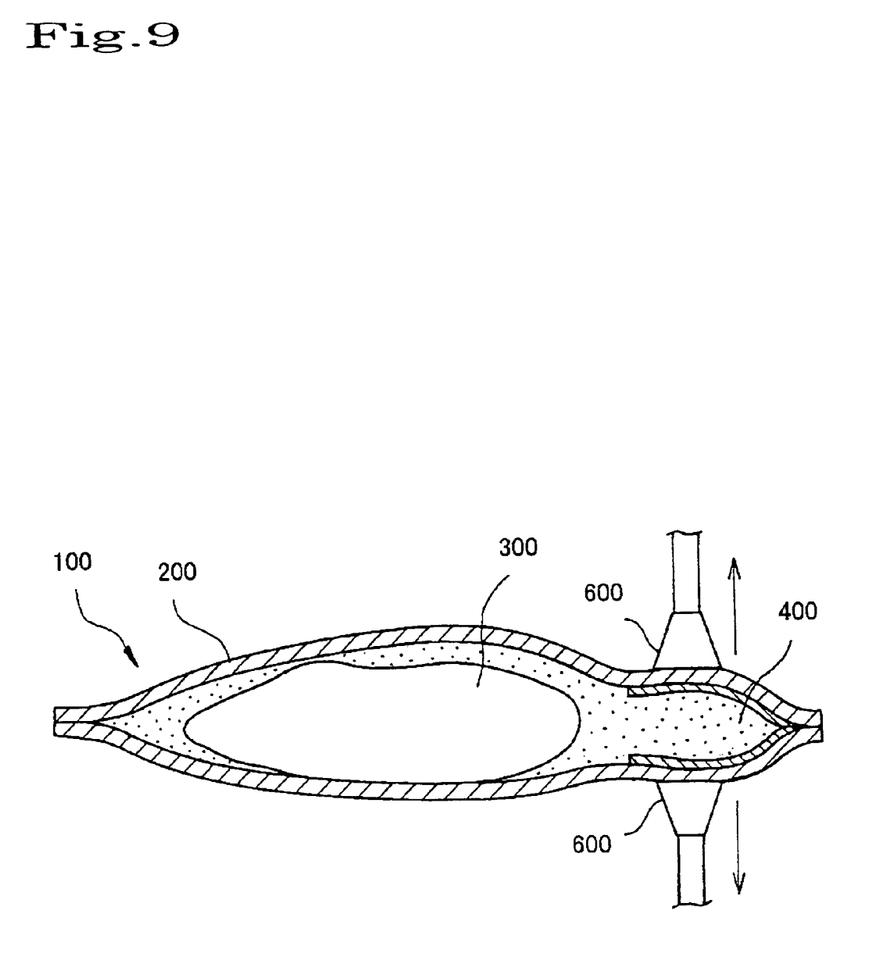
FIG. 9 is a top view showing the sealed container and pinhole-detection process of the invention.

FIG. 7 to FIG. 9 show another embodiment of the invention.

In these figures, the container 200, the contents 300 and gas-filled body 400 of the sealed container 100 are basically the same as those shown in FIG. 5 and FIG. 6. However, in the case of this embodiment, the gas-filled body 400 is attached to and held between the inner sides of the container 200. The means for attachment can be adhesive, two-sided tape or the like.

Also, pinhole inspection of the sealed container 100 is performed as described below.

First, a pair of suction means 600, 600 that are located above and below the line become attached to the gas-filled body 400 from the outside of the container 200 (see FIG. 8). Next, the suction means 600, 600 return to their respective original positions and pull the gas-filled body 400 apart (see FIG. 9). At the same time, the helium gas is released from the gas-filled body and dispersed inside the sealed container. Next, suction from the suction means is stopped and everything is restored to its original position.

After that, the gas detector detects gas leakage as described above.

In the embodiments shown in FIG. 5 to FIG. 9, the gas-filled body 400 is formed as a small bag, however, it can also be formed into a capsule shape.

Also, in the embodiments described above, a pressure means 500 or suction means 600, 600 was used as the means for breaking the gas-filled body 400, however, a method other than these, such as an electromagnetic radiation means located on the line that breaks the gas-filled body by heating up the aluminum of the gas-filled body and using the heat of the aluminum to melt the plastic, is also possible. In this case, in order to prevent the container 200 from melting, a highly heat resistant plastic can be used as the material for the container, or the thin aluminum film can be used as the inner layer of the gas-filled body to avoid contact between the container and the aluminum.

Moreover, it is also possible to use a laser or ultrasonic waves as other means for breaking the gas-filled body. In these cases as well, by adequately changing the material of the gas-filled body or the container, it is possible to break just the gas-filled body from the outside of the container.

The reference numbers used in the drawings are as follows:
1 Leakage-detecting device
2 Base
3 Conveyor belt
3a Input conveyor
3b Output conveyor
4 Leakage-detection unit
5 Vibration-application means
6 Gas-detection means
7 Bracket
8 Link
9 Pressure plate
10 Motor
11 Box
12 Probe
13 Gas detector
14 Blower
15 Work-removal apparatus
16 Bracket
17 Plunger
18 Removal plate
W Sealed package
100 Sealed container
200 Container
300 Contents
400 Gas-filled body
500 Pressure means
600 Suction means

INDUSTRIAL APPLICABILITY

This invention is constructed as described above, so by pressing or applying vibration to sealed packages that are continuously fed at specified intervals, when there is a pinhole or crack in the sealed packages, the detection gas is forcibly pressed out from the pinhole or crack and thus it is possible to determine whether the package is defective or not.

Therefore, it is possible to continuously inspect the sealed packages W, as well as it is possible to inspect all of the packages.

Also, with the invention described above, inspection of gas leakage is performed using a small amount of inspection gas that is filled into a small bag-shaped or capsule-shaped gas-filled body, so it is possible to avoid wasting expensive inspection gas. Moreover, unlike in the prior technology in which the inspection gas was filled directly into the container, there is no gas leakage when filling with gas, so it is possible to use a high-performance gas detector and perform the inspection accurately and speedily. Furthermore, since it is possible to perform the pinhole inspection process continuously in the same location as the process for filling the contents and gas-filled body, it is thus possible to simplify the equipment and line and to improve the efficiency of the work.

What is claimed is:

1. A leakage-detecting device for sealed packages comprising:
   a conveyor belt that continuously moves sealed packages that have been filled with detection gas for detecting leakage;
   a work-removal apparatus; and
   a leakage-detection unit that is located along the conveying route of the conveyor and that detects leakage from said sealed packages; and wherein
   said conveyor belt comprises an input conveyor and an output conveyor;
   said leakage-detection unit comprises:
   a vibration-application means that applies vibration to the detection gas inside said sealed packages and
   a gas-detection means that detects detection gas that leaks from said sealed packages; and wherein
   said vibration-application means is a striking apparatus that strikes the sealed packages on said conveyor belt; and said striking apparatus further comprises:
   a bracket that is installed above said conveyor belt;
   a pressure plate that is attached to said bracket by way of a link, and the pressure plate strikes said sealed package by up and down movement of the pressure plate; and
   said gas-detection means comprises:
   a box that forms a detection space around said vibration-application means and conveyed sealed packages;
   a probe that is located in this box and draws in gas from inside said detection space, and
   a gas detector that is connected to this probe;
   a blower which connected to said box, sucks in the gas from inside the box and discharges it to the outside.

2. The leakage-detecting device for sealed packages of claim 1 wherein said detection gas is helium.

3. The leakage-detecting device for sealed packages of claim 1 wherein said sealed package has a gas-filled body contained therein whereby the gas-filled body is broken from the outside of the sealed package and the gas inside said gas-filled body fills the sealed package.

4. The sealed package as set forth in claim 3 wherein said gas-filled body is made of a layered material in which a chloroethylene or polypropylene film is layered on a thin aluminum film.

5. The sealed package as set forth in claim 3 wherein the gas filled in said gas-filled body is helium.

6. A pinhole detection method for sealed packages that breaks the gas-filled body inside the sealed package of claim 3 to disperse gas inside the sealed package and inspects whether or not there is gas leakage from that sealed package.

7. The pinhole detection method of claim 6 wherein breaking of said gas-filled body is performed by a pressure means from the outside of the sealed package.

8. The pinhole detection method of claim 6 wherein breaking of said gas-filled body is performed by a pair of suction means that pulls on both sides of the gas-filled body from the outside of the sealed package.

9. The pinhole detection method of claim 6 wherein breaking of said gas-filled body is performed by electromagnetic radiation from the outside of the sealed package.

10. The leakage-detecting device for sealed packages of claim 1, wherein said work-removal apparatus comprises:
    a bracket;
    a plunger which is attached to the bracket;
    a removal plate that moves said sealed package.

11. The leakage-detecting device for sealed packages of claim 10, wherein said removal plate is located facing said conveyor belt through a space, and is moved back and forth by said plunger in a direction orthogonal to the conveying direction of said conveyor belt.

12. The leakage-detecting device for sealed packages of claim 1, wherein said probe is spaced above and below the conveyor path of said sealed package.

13. The leakage-detecting device for sealed packages of claim 1, wherein said probe runs along the outer shape of said sealed package.

14. The leakage-detecting device for sealed packages of claim 1, wherein said probe is arranged such that it surrounds said sealed package.

* * * * *